(12) United States Patent
Chaix et al.

(10) Patent No.: US 7,708,228 B2
(45) Date of Patent: May 4, 2010

(54) SEQUENCING DEVICE FOR DEPLOYING A STRUCTURE AS A FUNCTION OF THE KINEMATICS OF ONE MOBILE BODY THEREOF

(75) Inventors: Rodolphe Chaix, Cuers (FR); Christian Daval, Mandelieu (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/017,099

(22) Filed: Dec. 21, 2004

(65) Prior Publication Data
US 2005/0156083 A1 Jul. 21, 2005

(30) Foreign Application Priority Data
Dec. 23, 2003 (FR) .................................. 03 15224

(51) Int. Cl.
*B64G 1/44* (2006.01)
(52) U.S. Cl. ................. 244/172.6; 244/172.7; 136/245; 136/292
(58) Field of Classification Search .............. 244/172.6, 244/172.7, 172.9, 172.8, 173.3, 159.5, 159.4; 136/243–245, 292; 403/52, 71, 102; 343/915, 343/881; 296/219; 160/229.1, 193
See application file for complete search history.

(56) References Cited

U.S. PATENT DOCUMENTS

| | | | | |
|---|---|---|---|---|
| 3,699,576 A | * | 10/1972 | Hoyer | 342/10 |
| 3,871,045 A | * | 3/1975 | Bouvet et al. | 14/2.4 |
| 4,510,637 A | * | 4/1985 | Zlotnicki | 14/2.4 |
| 4,529,277 A | * | 7/1985 | Gee et al. | 359/854 |
| 4,602,399 A | * | 7/1986 | Jenkins | 14/2.4 |
| 4,747,566 A | * | 5/1988 | Kiendl | 244/172.7 |
| 5,319,905 A | * | 6/1994 | Szirtes | 52/108 |
| 5,909,860 A | * | 6/1999 | Lee | 244/172.6 |
| 6,010,096 A | * | 1/2000 | Baghdasarian | 244/172.6 |
| 6,158,088 A | * | 12/2000 | Bulboaca | 16/291 |
| 6,191,757 B1 | * | 2/2001 | Bassily et al. | 343/915 |
| 6,478,261 B2 | * | 11/2002 | Laraway et al. | 244/172.6 |
| 6,484,972 B1 | * | 11/2002 | Viale | 244/172.6 |

FOREIGN PATENT DOCUMENTS

| FR | 2 768 400 A | 3/1999 |
|---|---|---|
| FR | 2 781 454 A | 1/2000 |

* cited by examiner

*Primary Examiner*—Michael R Mansen
*Assistant Examiner*—Joshua J Michener
(74) *Attorney, Agent, or Firm*—Sughrue Mion, PLLC (57) ABSTRACT

A device is disclosed for sequencing the deployment of a deployable structure comprising a first body, at least one second body mobile relative to the first body, and at least one third body mobile relative to either the first body or the second body and disposed, in an at least partially folded position of the structure, against or between the first and second bodies. The device comprises a first member fixedly mounted on the third body and preventing its deployment when it is immobilized and a second member mounted on the second body and immobilizing the first member until the second body has effected a selected portion of a kinematic that drives it from an initial position to a final position.

24 Claims, 6 Drawing Sheets

FIG. 11A  FIG. 11B  FIG. 11C

SEQUENCING DEVICE FOR DEPLOYING A STRUCTURE AS A FUNCTION OF THE KINEMATICS OF ONE MOBILE BODY THEREOF

CROSS-REFERENCE TO RELATED APPLICATIONS

This application is based on French Patent Application No. 03 15 224 filed Dec. 23, 2003, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of structures with deployable bodies, and to be more precise sequencing devices controlling at least in part the deployment of mobile bodies of such structures.

2. Description of the Prior Art

In the aerospace field, for example, certain structures are deployed when the craft (or platform) on which they are installed have reached their operating location (as in the case of a sensing or telecommunication satellite), or have effected a certain portion of their track or mission (as in the case of a spacecraft). This deployment, for example of solar panels of a solar generator and/or send and/or receive panels of a telecommunication antenna and/or panels of a heat transfer device, is effected in accordance with a predefined order and controlled by a sequencing device.

Some prior art sequencing devices allow the displacement of a body of a structure only once another body of the same structure, to which it is attached, has been deployed. To be more precise, each articulation attached to a first body to be deployed which is itself attached to a second body to be deployed is coupled to a sequencing device that authorizes the deployment of the second body only once it is in a locked or virtually locked position.

Thus this kind of sequencing device is not able to initiate the deployment of a body if the deployment of the body to which it is attached has not been completed, because it necessitates a locked state of the body that is being deployed and an element for indicating that locked state.

Thus an object of the invention is to improve on this situation and in particular to enable kinematic releases in intermediate deployment steps, with deployment devices (articulations) that have no locking state indication, and at the end of deployment.

SUMMARY OF THE INVENTION

To this end the present invention proposes a sequencing device for a deployable structure comprising a first body, at least one second body mobile relative to the first body, and at least one third body mobile relative to either the first body or the second body and disposed, in an at least partially folded position of the structure, against or between the first and second bodies, which device further comprises a first member fixedly mounted on the third body and adapted to prevent its deployment when it is immobilized and a second member mounted on the second body and adapted to immobilize the first member until the second body has effected a selected portion of a kinematic adapted to drive it from an initial position to a final position.

In an advantageous embodiment of the invention the first member takes the form of a finger and the second member takes the form of a first arm having an end portion conformed to immobilize the finger. In this case, the end portion comprises a shaft (or a bar) substantially perpendicular to the first arm and adapted to immobilize the finger.

The device of the invention may have other features, and in particular the following features, used separately or in combination:

the first body may comprise a fixed third member that is adapted to constrain the second member to immobilize the first member until the second body has effected the selected portion of the kinematic; in this case, the third member is a cam whose shape is selected to reproduce at least in part the selected portion of the kinematic;

when the end portion of the arm comprises a shaft (or a bar), the shaft may have first and second portions projecting on either side of the end portion of the first arm; the first portion is then adapted to immobilize the finger and the second portion then has one end adapted to slide along the cam in the course of the selected portion of the kinematic; in this case, the shaft (or bar) may be adapted, for example, to be moved in translation substantially perpendicularly to the first arm by a return force when the end of its second portion is no longer in contact with the cam so as to move from a first position in which it immobilizes the finger to a second position in which it releases the finger;

alternatively, the arm may be mounted to be rotated on the second body by a return force and its end portion is adapted to be placed in a first position in which it follows a profile of the cam that reproduces the selected portion of the kinematic, whilst immobilizing the finger when the second body moves toward its final position, and in a second position in which it releases the finger when it is no longer constrained to follow the cam profile; in this case, the end portion of the arm comprises a rotatable cylinder (or roller) adapted to bear against the cam profile;

in another variant, the finger is again substantially in alignment with the third body, and the end portion of the arm comprises a groove in which is mounted to rotate a bracket having a first portion adapted to bear against the cam in the course of the selected portion of the kinematic and a second portion adapted to immobilize the finger;

in another variant, the third member may be a second arm having an end portion comprising a groove, and the shaft is mounted to rotate at the end of the first arm and comprises first and second portions projecting, in an immobilizing position, on either side of the end portion of the first arm; the first portion is then adapted to immobilize the finger when the second portion is accommodated in the groove, i.e. until the second body has effected the selected portion of the kinematic.

The invention also proposes a deployable structure comprising a first body, at least one second body mobile relative to the first body, and at least one third body mobile relative to either the first body or the second body and disposed, in a folded position of the structure, against or between the first body and the second body, which deployable structure further comprises at least one sequencing device of the above type.

In a structure of the above kind, the selected portion of the kinematic of the second body comprises at least one pure rotation over a selected angular sector, or at least one movement in pure translation over a selected distance, or a combination of at least one pure rotation over a selected angular sector and/or at least one movement in pure translation over a selected distance.

Furthermore, at least one of the bodies may constitute at least a portion of a telecommunication antenna and/or at least a portion of a solar generator and/or at least a portion of a heat transfer device.

The invention is particularly well suited, although not exclusively so, to spacecraft and space platforms equipped with at least one deployable structure of the type described above.

Other features and advantages of the invention will emerge on reading the following detailed description and examining the appended drawings.

DETAILED DESCRIPTION OF THE PREFERRED EMBODIMENTS

The appended drawings constitute part of the description of the invention as well as, if necessary, contributing to the definition of the invention.

An object of the invention is to obtain the optimum deployment of a structure installed on a space platform or a spacecraft, for example, and comprising at least two bodies that have to be deployed.

As described hereinafter, the bodies to be deployed are panels constituting at least part of a solar generator, for example. The invention is not limited to this type of panel, however. It relates equally to panels constituting at least part of a telecommunication antenna or a heat transfer device (such as calorstats coupled to passive radiators, for example), for example, as well as any combination of portions of a solar generator and/or a telecommunication antenna and/or a heat transfer device. More generally, the invention relates to any type of body to be deployed sequentially, and to panels in particular.

Figure 1A:
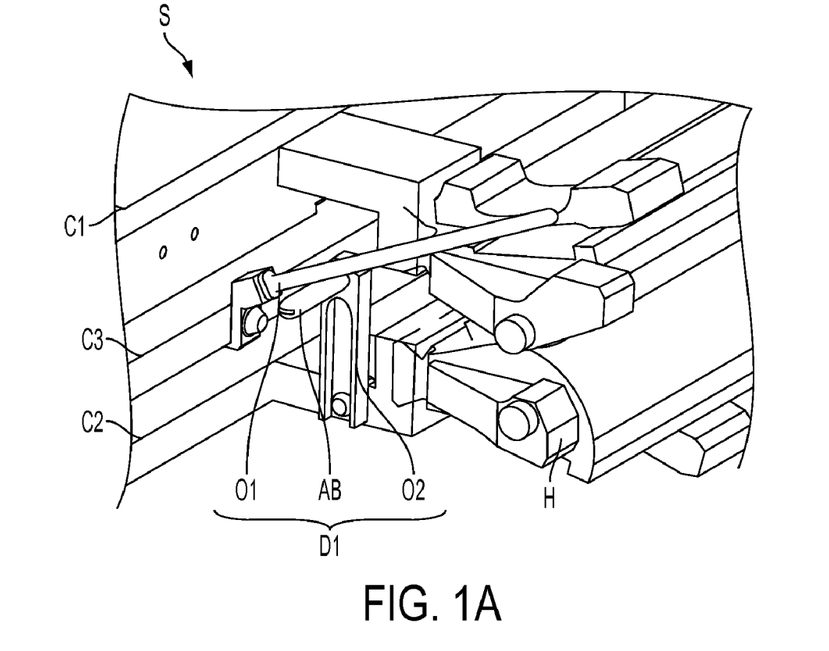
FIGS. 1A to 1C show three respective states of a first embodiment of a sequencing device of the invention.
Figure 1B:
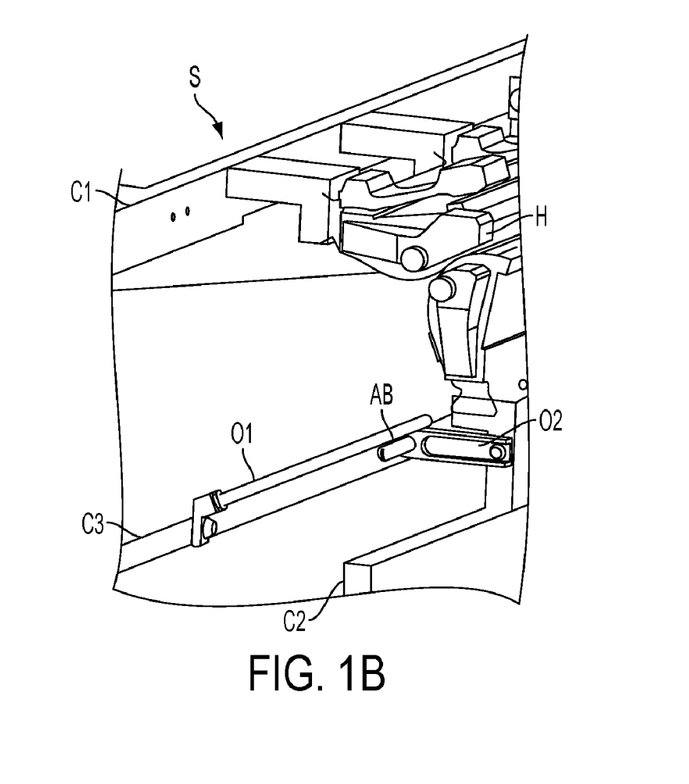
Figure 1C:
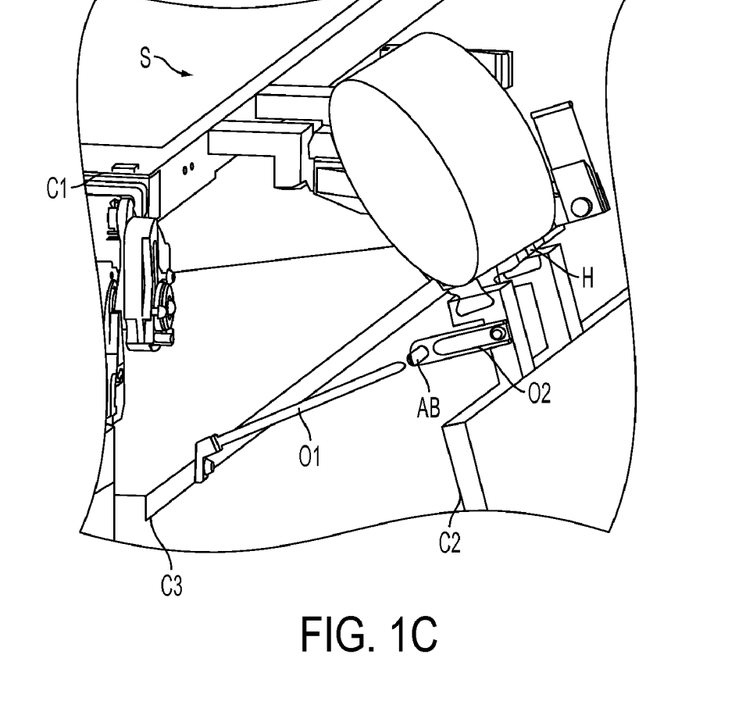

A first embodiment of a sequencing device of the invention is described first with reference to FIGS. 1A to 1C.

The structure S shown in part in FIGS. 1A to 1C comprises a first body C1 constituting the panel of a central pylon of a satellite, for example, a second body C2 mounted so as to be mobile relative to the first body C1 by virtue of an articulation H and constituting another panel, and a third body C3 that is mounted so as to be mobile relative to the second body C2 by virtue of another articulation (not shown) and constituting a further panel.

As shown in FIG. 1A, in the folded state of the structure S, which constitutes its initial state, the three bodies C1 to C3 are substantially parallel to each other with the third body C3 interleaved between the first body C1 and the second body C2.

The structure S is further equipped with a sequencing device D comprising a first member O1 fixedly mounted on the third body C3 and a second member O2 mounted on the second body C2 and co-operating with the first member O1.

To be more precise, the first member O1 prevents deployment of the third body C3 for as long as it is retained in a locking position and the second member O2 immobilizes the first member O1 until the second body C2 has completed a selected portion of a kinematic designed to drive it from an initial position to a final position.

In the present context the term "kinematic" means a trajectory that may consist of a pure rotation over a selected angular sector, a movement in pure translation over a selected distance, or a combination of at least one pure rotation over a selected angular sector and at least one pure translation over a selected distance.

By way of illustrative example, this embodiment considers the kinematic of the second body C2 to be a pure rotation, for example through 180°, to place it in a final position in alignment with the first body C1 (and substantially in the same plane). Consequently, the selected portion of the kinematic of the second body C2 is an angular sector equal to 95°, for example.

Thus here the sequencing device D allows deployment of the third body C3 when the second body C2 has effected a portion of its complete 180° rotation, namely a rotation of 95°. In other words, deployment of the third body C3 is allowed even though the deployment of the second body C2 has not been completed.

In the example shown, the first member O1 takes the form of a rod of selected length extending obliquely in line with the third body C3 (initially on the side of the articulation H). Moreover, the second member O2 here takes the form of an arm mounted so that it is substantially perpendicular to the second body C2 and has on its end portion PT a substantially perpendicular locking pin AB.

The first member (finger) O1 is therefore substantially perpendicular to the second member O2 and initially located under the latter, to immobilize it. To be more precise, being immobilized by the pin AB on the arm O2, the finger O1 prevents the third body C3 from effecting its own kinematic (which is a rotation of approximately 180°, for example).

As shown in an intermediate situation in FIG. 1B, the finger O1 slides on the pin AB and prevents rotation of the third body C3 until the second body C2 has effected a rotation of 95°. The length of the finger O1 is therefore selected to enable it to remain above the pin AB during the first 95° of the rotation of the second body C2. Beyond this 95° rotation, the finger O1 is no longer retained by the pin AB, as shown in FIG. 1C, thus allowing deployment of the third body C3.

The release angle (which here is equal to 95°) is the limit angle from which the third body C3 is able to deploy without risk of striking the first body C1 and without impeding the second body C2 during the end phase of its kinematic.

A second embodiment of a sequencing device of the invention is described next with reference to FIGS. 2A to 2C.

The structure S shown in part in FIGS. 2A to 2C again comprises a first body C1 constituting the panel of a central pylon of a satellite, for example, a second body C2-1 that is mounted so that it is mobile relative to the first body C1 by virtue of an articulation H and which constitutes another panel, a third body C3 that is mounted so that it is mobile relative to the second body C2-1 by virtue of another articulation (not shown) and which constitutes a further panel, and a fourth body C2-2 that is mounted so that it is mobile relative to the second body C2-1 by virtue of another articulation (not shown) and which constitutes a further panel.

Figure 2A:
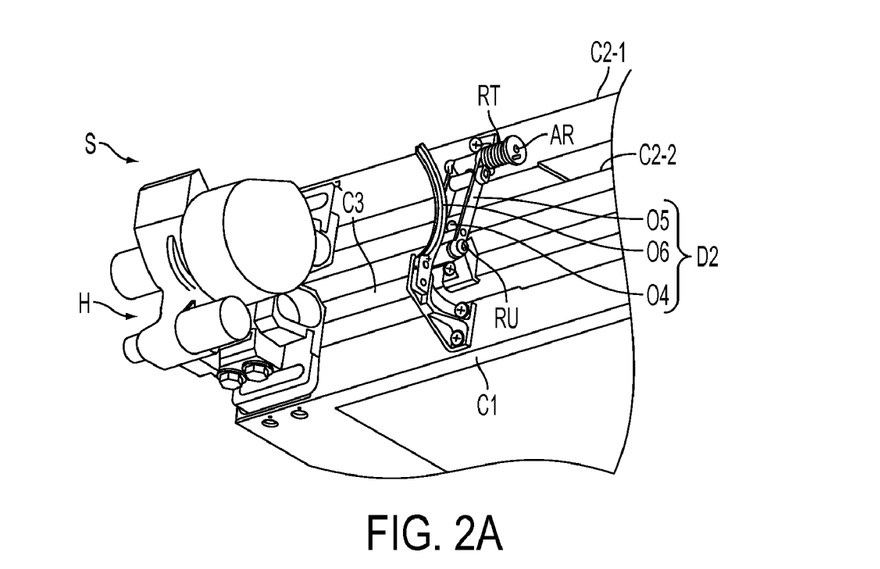
FIGS. 2A to 2C show three respective states of a second embodiment of a sequencing device of the invention.
Figure 2B:
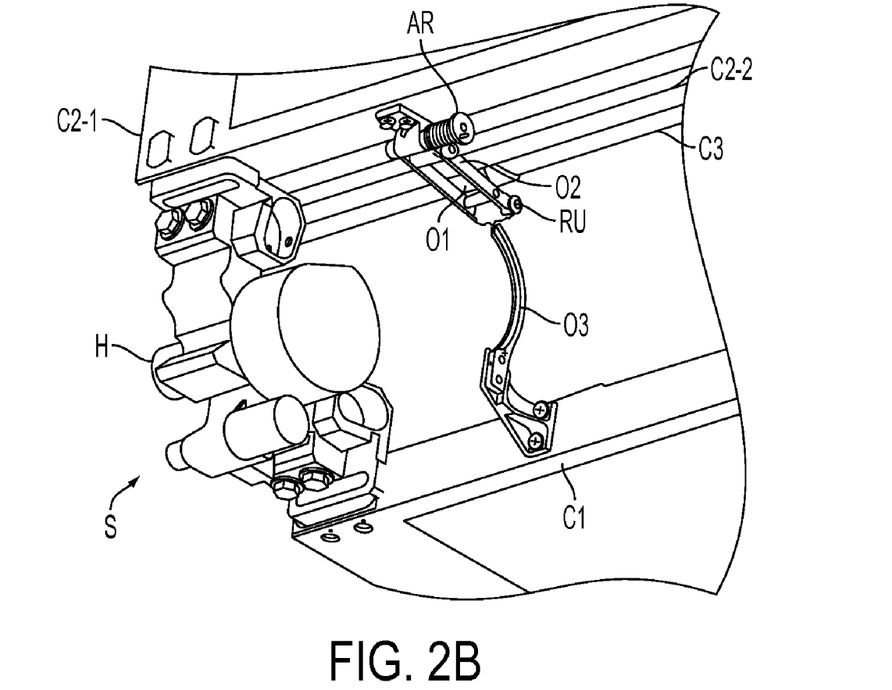
Figure 2C:
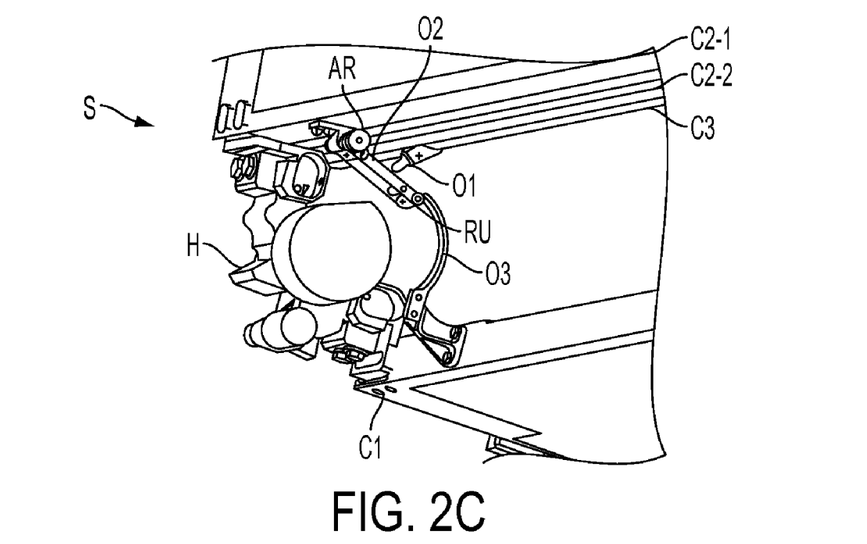

As shown in FIG. 2A, in the folded state of the structure S, which constitutes its initial state, the four bodies C1 to C3 are substantially parallel to each other with the third body C3 interleaved between the first body C1 and the second body C2-1, to be more precise between the first body C1 and the fourth body C2-2.

The structure S is further equipped with a sequencing device D comprising a first member O4 fixedly mounted on the third body C3, a second member O5 mounted on the second body C2-1 and co-operating with the first member O4, and a third member O6 fixedly mounted on the first body C1 and co-operating with the second member O5.

To be more precise, the first member O4 prevents the deployment of the third body C3 for as long as it is retained in a locking position. The second member O5 immobilizes the first member O4 for as long as the second body C2-1 has not effected a selected portion of a kinematic intended to drive it from an initial position to a final position. The third member O6 immobilizes the second member O5 for as long as the second body C2-1 has not effected the selected portion of its kinematic.

By way of illustrative example, in this embodiment the kinematic of the second body C2-1 is considered to be a pure rotation, for example of 180°, intended to place it in a final position aligned with the first body C1 (and substantially in the same plane). Consequently, the selected portion of the kinematic of the second body C2-1 is an angular sector equal to 95°, for example. Of course, as indicated in the preceding example, the kinematic could be different from a pure rotation, for example a translation, possibly combined with a rotation.

Thus here the sequencing device D allows the deployment of the third body C3 and the fourth body C2-2 when the second body C2-1 has effected a portion of its complete 180° rotation, namely a rotation of 95°. In other words, deployment of the third body C3 and the fourth body C2-2 are allowed even though the deployment of the second body C2-1 has not necessarily been completed.

In the example shown, the first member O4 takes the form of a short rod extending obliquely in line with the third body C3 (initially at the same end as the articulation H).

Moreover, the second member O5 here takes the form of an arm mounted to rotate on the second body C2-1. To be more precise, it comprises an assembly of two bars with their ends connected in pairs, at one end by a rotation axis AR fastened to a spring RT providing a return force and fastened to the second body C2-1, and at the opposite end by a rotatable roller (or cylinder) RU. The two bars, the roller RU and the shaft AR delimit a central empty space adapted to receive the finger O4 for as long as the second body C2-1 has not reached its limit position tripping releasing of the third body C3 and the fourth body C2-2.

Furthermore, the third member O6 here takes the form of a cam whose lower profile reproduces at least in part the selected portion of the kinematic of the second body C2-1 between its initial position and its limit position.

As shown in FIG. 2A, in the folded position of the structure S, the second member O5 is under the cam O6. To be more precise, its roller RU is urged by the spring RT against the lower portion of the cam O6. The finger O4 is therefore immobilized in the central empty space defined in the second member O5, which prevents the third body C3 from effecting its own kinematic (which is a rotation of approximately 180°, for example.

For as long as the second body C2-1 has not effected a rotation of 95° (defining the limit position shown in FIG. 2B), the second member O5 is constrained to rise up the cam O6 (its roller RU bearing against the lower face of the cam O6 and limiting friction) whilst immobilizing the finger O4, thereby preventing rotation of the third body C3. Beyond these 95°, as shown in FIG. 1C, the profile of the cam O6 stops, which releases the front portion of the second member O2 (including the roller RU). The spring RT then causes the second member O5 to rotate, which releases the finger O4, thereby allowing the third body C3 to deploy.

The release angle (which here is equal to) 95° is the angle from which the third body C3 may be deployed without risk of striking the first body C1 and without impeding the second body C2-1 during the end phase of its kinematic.

A third embodiment of a sequencing device of the invention is described next with reference to FIG. 3. This embodiment is a first variant of the second embodiment described above with reference to FIGS. 2A to 2C.

In this first variant, the third member O9 takes the form of a fixed cam whose lateral profile reproduces at least in part the selected portion of the kinematic of the second body C2-1 between its initial position and its limit position.

The first member O7 takes the form of a finger (lug) fixedly mounted on one end of the third body C3 by means of a support and substantially parallel thereto.

Moreover, the second member O8 takes the form of an arm fixedly mounted on the second body C2-1 and having an end portion with a groove G in which is mounted a bracket EQ that can rotate about an axis AX. A first portion SP of the bracket EQ has one end that is preferably spherical and is adapted to bear against the lateral surface of the cam O9 and a second portion DT of said bracket EQ that is substantially perpendicular to the first portion SP co-operates with the finger O7.

Figure 3:
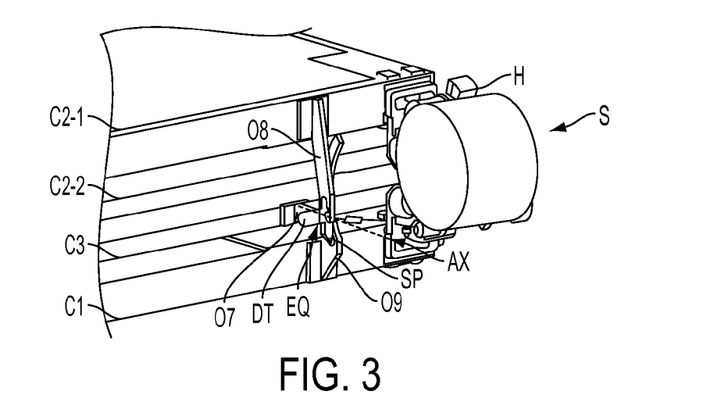
FIG. 3 shows a third embodiment of a sequencing device of the invention.

As shown in FIG. 3, in the folded position of the structure S, the spherical end of the first portion SP of the bracket EQ bears against the lateral profile of the cam O9 and the second portion DT is retained by the end of the finger O7. The finger O7 is immobilized because rotation of the bracket EQ is prevented, which prevents the third body C3 from effecting its own kinematic (for example a rotation of approximately 180°).

For as long as the second body C2-1 has not effected a rotation of 95°, for example, defining its limit position, the first portion SP of the bracket EQ is constrained to slide along the cam O9 and the second portion DT remains immobilized by the finger O7, thereby preventing rotation of the third body C3. Beyond these 95°, the profile of the cam O9 stops, which releases the first portion SP of the bracket EQ. The bracket EQ is then able to turn, and its second portion DT releases the finger O7, thereby allowing the third body C3 to deploy.

A fourth embodiment of a sequencing device of the invention is described next with reference to FIG. 4. This embodiment is a second variant of the second embodiment described above with reference to FIGS. 2A to 2C.

In this second variant, the third member O12 takes the form of a fixed cam whose lateral profile reproduces at least in part the selected portion of the kinematic of the second body C2-1 between its initial position and its limit position.

The first member O10 takes the form of a detent or finger fixedly mounted on one end of the third body C3 and substantially aligned therewith.

Moreover, the second member O11 takes the form of an arm fixedly mounted on the second body C2-1 and lying in a plane substantially perpendicular thereto and whose end portion opposite the fixing end comprises a pin AT. This pin AT can move in translation substantially perpendicularly to the arm O2 and to the finger O10. It has a first end portion adapted to immobilize the finger O10 and a second end portion, opposite the first, and provided with a spring RT' for generating a return force. The second end portion is adapted to be pressed by the spring RT' against the lateral profile of the cam O12.

Figure 4:
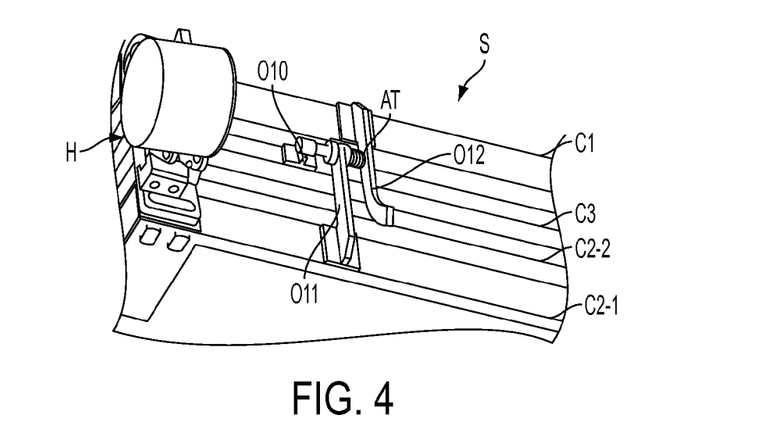
FIG. 4 shows a fourth embodiment of a sequencing device of the invention.

As shown in FIG. 4, in the folded position of the structure S, the lateral profile of the cam O12 prevents movement in translation of the pin AT of the second member O11. The third body C3 is not able to effect its personal kinematic (for example a rotation of approximately 180°) because the finger O10 is immobilized by the first end portion of the pin AT.

For as long as the second body C2-1 has not effected a rotation of 95°, for example, defining its limit position, the pin A2 of the second member O11 is constrained to slide along the cam O12 (with its second end portion bearing against the lateral profile of the cam O12), thereby immobilizing the finger O10 and preventing rotation of the third body C3. Beyond these 95°, the profile of the cam O12 stops, which allows the pin AT to be moved in translation by the spring RT' in a direction opposite to the finger O10. The third body C3 may then deploy because the movement in translation releases the finger O10.

A fifth embodiment of a sequencing device of the invention is described next with reference to FIG. 5. This example is a third variant of the second embodiment described above with reference to FIGS. 2A to 2C.

In this third variant, the third member O15 takes the form of an arm fixedly mounted on the first body C1, lying in a plane substantially perpendicular thereto, extending highly obliquely in the direction of the second body C2-1 and the third body C3, and having an end portion opposite the fixing end comprising a groove G'.

The first member O13 takes the form of a finger fixedly mounted on one end of the third body C3, substantially in alignment therewith and preferably slightly oblique thereto.

The groove G' of the third member O15 and the end of the finger O13 are at substantially the same level and spaced by a selected distance.

The second member O14 takes the form of an arm fixedly mounted on the second body C2-1, lying in a plane substantially perpendicular thereto, and whose end portion opposite the fixing end is intended initially to be interleaved substantially between the groove G' of the third member O15 and the end of the finger O13. This end portion comprises a rotatable bar B that is preferably slightly flattened. This bar B has two free end portions, its first end being adapted to be accommodated in the groove G' of the third member O15 and its second end being adapted to immobilize the end of the finger O13.

Figure 5:
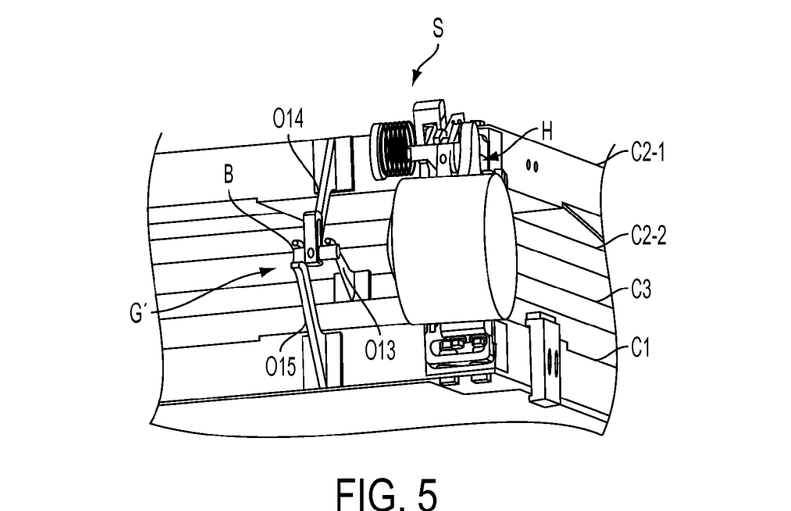
FIG. 5 shows a fifth embodiment of a sequencing device of the invention.

As shown in FIG. 5, in the folded position of the structure S, the first end of the bar B of the second member O14 is immobilized in the groove G' of the third member O15, with the result that the bar B is unable to turn and immobilizes the finger O13, thereby preventing the third body C3 from effecting its own kinematic (which is a rotation of approximately 180°, for example).

For as long as the second body C2-1 has not effected a rotation, for example of 95°, defining its limit position, the bar B of the second member O14 immobilizes the finger O13 and therefore prevents rotation of the third body C3. Beyond these 95°, the first end of the bar B escapes from the groove G' of the third member O15, with the result that the bar B is able to turn about its rotation axis, thereby releasing the finger O13 and enabling the third body C3 to deploy.

The sequences controlled by devices D of the invention may relate to a very large number of situations, some of which are shown diagrammatically in FIGS. 6 to 11.

Figure 6A:
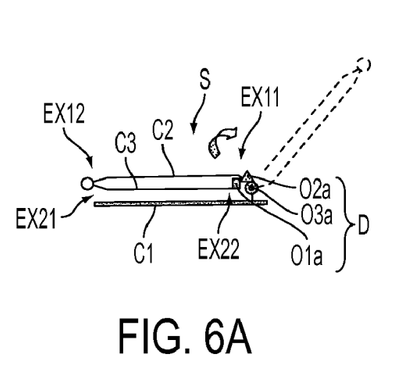
FIGS. 6A and 6B show diagrammatically two respective phases of the deployment of panels of a first example of a deployable structure employing a single sequencing device of the invention.
Figure 6B:
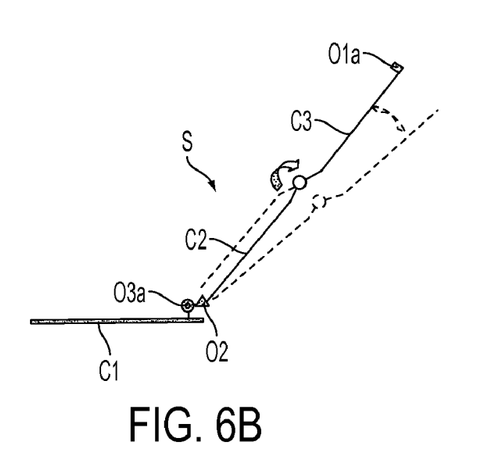

To be more precise, the sequence shown in FIGS. 6A and 6B relates to a structure S comprising a first body (panel) C1 that is fixed, a second body (panel) C2 that is mounted to be mobile on the first body C1 by virtue of an articulation installed in part on a first end EX11, and a third body C3 mounted to be mobile on the second body C2 by virtue of an articulation installed on a first end EX21 and on a second end EX12 of the second body, opposite its first end EX11. Here the first body C1, the second body C2 and the third body C3 are substantially parallel, the third body C3 being initially interleaved between the first body C1 and the second body C2.

The sequencing device D of the invention here comprises, firstly, a first member O1a (taking the form of a finger, for example, and represented by a black rectangle), mounted on a second end EX22 of the third body C3, opposite its first end EX21, secondly, a second member O2a (taking the form of an arm, for example, and represented by a light gray triangle), mounted at the first end EX11 of the second body C2, and, thirdly, a third member O3a (taking the form of a cam, for example, and shown by a dark gray circle), fixedly mounted on the first body C1.

In FIG. 6A, the dashed lines show the limit position beyond which the third member O3a releases the second member O2a which in turn releases the first member O1a.

In FIG. 6B, the continuous lines show the deployment of the third body C3 once the second body C2 has moved beyond its limit position, and the dashed lines show the final (deployed) position of the structure S. Clearly, in this example, the second body C2 continues its stroke (trajectory or kinematic) over a small angular sector (typically 15°) after reaching its limit position.

Figure 7A:
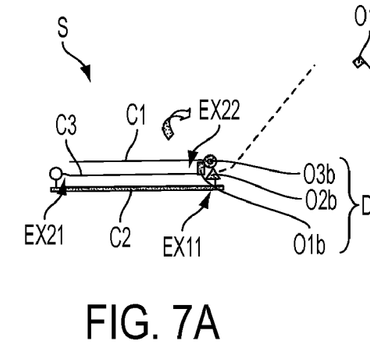
FIGS. 7A and 7B show diagrammatically two respective phases of the deployment of panels of a second example of a deployable structure employing a single sequencing device of the invention.
Figure 7B:
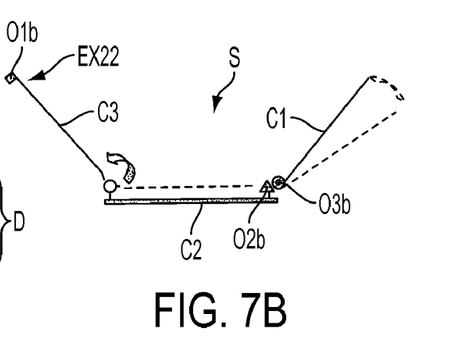

The sequence shown in FIGS. 7A and 7B is intended to demonstrate the relative nature of the movements of one body relative to another.

This sequence relates to a structure S comprising a first body (panel) C1 a second body (panel) C2 mounted to be mobile relative to the first body C1 by virtue of an articulation installed in part at a first end EX11, and a third body C3 mounted to be mobile on the second body C2 by virtue of an articulation installed in part at a first end EX21. Here the first body C1, the second body C2 and the third body C3 are substantially parallel, the third body C3 being initially interleaved between the first body C1 and the second body C2.

Here the sequencing device D of the invention comprises, firstly, a first member O1b (taking the form of a finger, for example, and represented by a black rectangle), mounted at a second end EX22 of the third body C3 opposite its first end EX21, secondly, a second member O2b (taking the form of an arm, for example, and represented by a light gray triangle), mounted at the first end EX11 of the second body C2, and, thirdly, a third member O3*b* (taking the form of a cam, for example, and represented by a dark gray circle), fixedly mounted on the first body C1.

Here the fixed frame of reference is on the second body C2, which is therefore "fixed". Note that by displacing the fixed frame of reference onto the first body C1 the arrangement of FIG. 6 is obtained, which demonstrates the relative nature of the movements of the bodies relative to each other. In other words, according to the invention, it amounts to the same thing to displace the second body relative to the first body, when the latter is fixed, or to displace the first body relative to the second body, when the latter is fixed (as is the case in the example shown in FIGS. 7A and 7B).

In FIG. 7A, the dashed line shows the (relative) limit position beyond which the third member O3*b* releases the second member O2*b* which in turn releases the first member O1*b*.

For as long as the second body C2 has not reached its limit position relative to the first body C1 (here it is in fact the first body C1 that moves away from the second body C2), the third body C3 remains substantially immobile relative to the second body C2.

Then, once the first body C1 has reached the position shown by the right-hand continuous line in FIG. 7B, which corresponds to the limit position of the second body C2, the third body C3 is released and may be deployed to its final position (shown by the left-hand continuous line in FIG. 7B), and at the same time the first body C1 continues its stroke (trajectory or kinematic) toward its final position (shown by the right-hand dashed line in FIG. 7B), which defines the final position of the second body C2 relative to it.

An alternative to this kinematic entails eliminating the cam O3*b* and using a long finger O1*b* fixed to C3, which amounts to the arrangement described above with reference to FIGS. 1A to 1C.

Figure 8A:
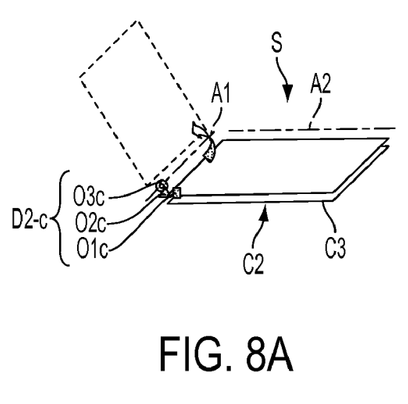
FIGS. 8A and 8B show diagrammatically two respective phases of the deployment of panels of a third example of a deployable structure employing a single sequencing device of the invention.
Figure 8B:
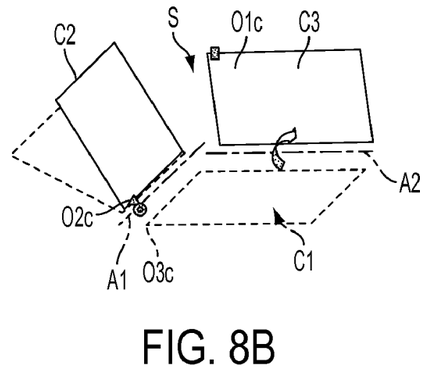

The sequence shown in FIGS. 8A and 8B relates to a structure S comprising a first body (panel) C1, a second body (panel) C2 mounted to be mobile on the first body C1 by virtue of an articulation installed on a first rotation axis A1, and a third body C3 mounted to be mobile on the first body C1 by virtue of an articulation installed on a second rotation axis A2 substantially perpendicular to the first shaft A1. Here the first body C1, the second body C2 and the third body C3 are substantially parallel to each other, the third body C3 being initially interleaved between the first body C1 and the second body C2. Here the first body (panel) C1 is fixed, but as in the preceding example the second body could be fixed instead of the first.

Here the sequencing device D2-*c* of the invention comprises, firstly, a first member O1*c* (taking the form of a finger, for example, and represented by a black rectangle), mounted on the third body C3, secondly, a second body O2*c* (taking the form of an arm, for example, and represented by a light gray triangle), mounted on the second body C2, and, thirdly, a third member O3*c* (taking the form of a cam, for example, and represented by a dark gray circle), fixedly mounted on the first body C1.

In this example, the third body C3 remains substantially immobile relative to the first body C1 for as long as the second body C2 has not reached its limit position shown by the dashed line in FIG. 8A and in continuous line in FIG. 8B. Once this position has been reached, the third member O3*c* releases the second member O2*c* which in turn releases the first member O1*c*. The third body C3 is then released and may be deployed to its final position (shown by the continuous line on the right in FIG. 8B), and at the same time the second body C2 continues its stroke (trajectory or kinematic) toward its final position (shown by the dashed line on the left in FIG. 8B).

Figure 9A:
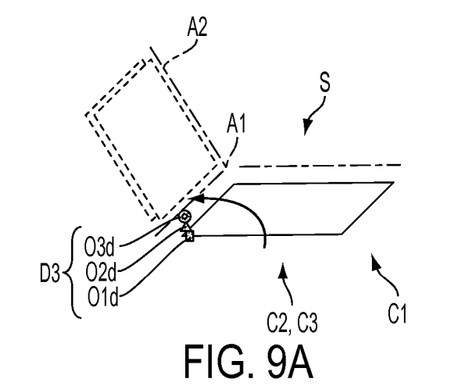
FIGS. 9A and 9B show diagrammatically two respective phases of the deployment of panels of a fourth example of a deployable structure employing a single sequencing device of the invention.
Figure 9B:
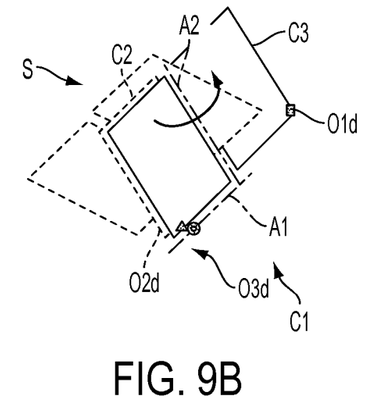

The sequence shown in FIGS. 9A and 9B relates to a structure S comprising a fixed first body (panel) C1, a second body (panel) C2 mounted to be mobile on the first body C1 by virtue of an articulation installed on a first rotation axis A1, and a third body C3 mounted to be mobile on the second body C2 by virtue of an articulation installed on a second rotation axis A2 substantially perpendicular to the first shaft A1. Here the first body C1, the second body C2 and the third body C3 are substantially parallel to each other, the third body C3 being initially interleaved between the first body C1 and the second body C2.

Here the sequencing device D3 of the invention comprises, firstly, a first member O1*d* (taking the form of a finger, for example, and represented by a black rectangle), mounted on the third body C3, secondly, a second member O2*d* (taking the form of an arm, for example, and represented by a light gray triangle), mounted on the second body C2, and, thirdly, a third member O3*d* (taking the form of a cam, for example, and represented by a dark gray circle), fixedly mounted on the first body C1 at the location of the first rotation axis A1.

In this example, the third body C3 follows the trajectory (kinematic) of the second body C2 for as long as the latter has not reached its limit position shown in dashed line in FIG. 9A and in continuous line in FIG. 9B. Once this position has been reached, the third member O3*d* releases the second member O2*d* which in turn releases the first member O1*d*. The third body C3 is then released and may be deployed to its final position (shown by the dashed line on the right in FIG. 9B), alongside the second body C2, and at the same time the second body C2 continues its stroke (trajectory or kinematic) toward its final position (shown by the dashed line on the left in FIG. 9B), entraining the third body C3 with it.

Figure 10A:
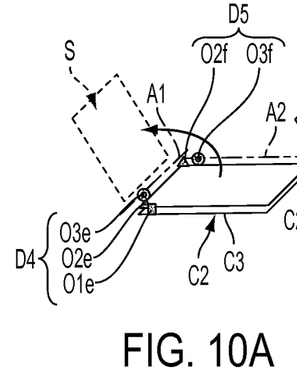
FIGS. 10A to 10C show diagrammatically three respective phases of the deployment of panels of a fifth example of a deployable structure using two sequencing devices of the invention.
Figure 10B:
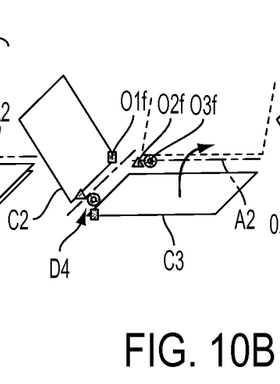
Figure 10C:
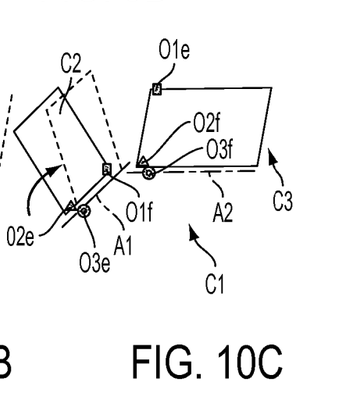

The sequence shown in FIGS. 10A to 10C relates to a structure S comprising a fixed first body (panel) C1, a second body (panel) C2 mounted to be mobile on the first body C1 by virtue of an articulation installed on a first rotation axis A1, and a third body C3 mounted to be mobile on the first body C1 by virtue of an articulation installed on a second rotation axis A2 substantially perpendicular to the first shaft A1. Here the first body C1, the second body C2 and the third body C3 are substantially parallel to each other, the third body C3 being initially interleaved between the first body C1 and the second body C2.

Here the structure S is equipped with two sequencing devices D4 and D5 according to the invention.

Here the first sequencing device D4 comprises, firstly, a first member O1*e* (taking the form of a finger, for example, and represented by a black rectangle), mounted on the third body C3, secondly, a second member O2*e* (taking the form of an arm, for example and represented by a light gray triangle), mounted on the second body C2, and, thirdly, a third member O3*e* (taking the form of a cam, for example, and represented by a dark gray circle), fixedly mounted on the first body C1 at the location of the first rotation axis A1.

Here the second sequencing device D5 comprises, firstly, a first member O1*f* (taking the form of a finger, for example, and represented by a black rectangle), mounted on the second body C2, secondly, a second member O2*f* (taking the form of an arm, for example, and represented by a light gray triangle), mounted on the third body C3, and, thirdly, a third member O3*f* (taking the form of a cam, for example, and represented by a dark gray circle), fixedly mounted on the first body C1 at the location of the second rotation axis A2.

In this example, the first sequencing device D4 controls the triggering of the deployment of the third body C3 and the second sequencing device D5 controls the triggering of the final deployment of the second body C2.

To be more precise, the third body C3 remains substantially immobile relative to the first body C1 for as long as the second body C2 has not reached its limit position shown in dashed line in FIG. 10A and in continuous line in FIGS. 10B and 10C. Once this position has been reached, the third member O3$e$ of the first device D4 releases the second member O2$e$ which in turn releases the first member O1$e$. The third body C3 is then released and may be deployed to its limit (and final) position shown by the dashed line in FIG. 10B and the continuous lines in FIG. 10C. The second body C2 remains substantially immobile in its limit position until the third body C3 has reached its own limit position. Once this position has been reached, the third member O3$f$ of the second device D5 releases the second member O2$f$ which in turn releases the first member O1$f$. The second body C12 is then released and may finally be deployed to its final position shown by the dashed line in FIG. 10C (which entails it moving slightly backwards).

Figure 11A:
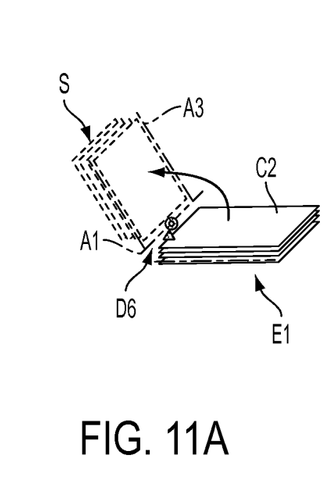
FIGS. 11A to 11C show diagrammatically three respective phases of the deployment of panels of a sixth example of a deployable structure using two sequencing devices of the invention.
Figures 11B, 11C:
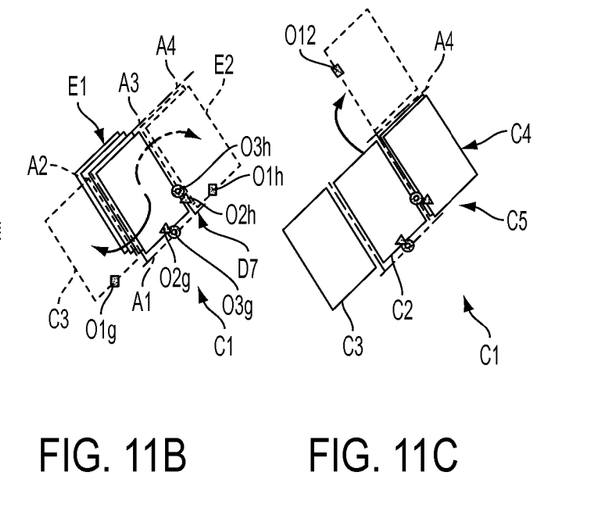

The sequence shown in FIGS. 11A to 11C relates to a structure S comprising a fixed first body (panel) C1, a second body (panel) C2 mounted to be mobile on the first body C1 by virtue of an articulation installed on a first rotation axis A1, a third body C3 mounted to be mobile on the second body C2 by virtue of an articulation installed on a second rotation axis A2 substantially perpendicular to the first shaft A1, a fourth body C4 mounted to be mobile on the second body C2 by virtue of an articulation installed on a third rotation axis A3 substantially parallel to the second shaft A2, and a fifth body C5 mounted to be mobile on the fourth body C4 by virtue of an articulation installed on a fourth rotation axis A4 substantially parallel to the first shaft A1 and substantially perpendicular to the third shaft A3. Here the first body C1, the second body C2, the third body C3, the fourth body C4 and the fifth body C5 are initially substantially parallel to each other, the third body C3 being interleaved between the first body C1 and the fifth body C5, the fifth body C5 being interleaved between the third body C3 and the fourth body C4, and the fourth body C4 being interleaved between the second body C2 and the fifth body C5.

The second body C2, the third body C3, the fourth body C4 and the fifth body C5 constitute a first subassembly E1 and the fourth body C4 and the fifth body C5 constitute a second subassembly E2.

Here the structure S is equipped with two sequencing devices D6 and D7 according to the invention.

Here the first sequencing device D6 comprises, firstly, a first member O1$g$ (taking the form of a finger, for example, and represented by a black rectangle), mounted on the third body C3, secondly, another first member O1$h$ (taking the form of a finger, for example, and represented by a black rectangle), mounted on the fourth body C4, thirdly, a second member O2$g$ (taking the form of an arm, for example, and represented by a light gray triangle), mounted on the second body C2, and, thirdly, a third member O3$g$ (taking the form of a cam, for example, and represented by a dark gray circle), fixedly mounted on the first body C1 at the location of the first rotation axis A1.

Here the second sequencing device D7 comprises, firstly, a first member O1$h$ (taking the form of finger, for example, and represented by a black rectangle), mounted on the fifth body C5, secondly, a second member O2$h$ (taking the form of an arm, for example, and represented by a light gray triangle), mounted on the fourth body C4, and, thirdly, a third member O3$h$ (taking the form of cam, for example, and represented by a dark gray circle), fixedly mounted on the second body C2 at the location of the third rotation axis A3.

In this example, the first sequencing device D6 controls the triggering of the deployment of the third body C3 and the second subassembly E2 (C4 and C5) and the second sequencing device D7 controls the triggering of the final deployment of the fifth body C5.

In this example, the second body C2 entrains in its stroke (trajectory or kinematic) the whole of the first subassembly E1 until it reaches its limit position shown in dashed line in FIG. 11A and in continuous line in FIG. 11B. Once this position has been reached, the third member O3$g$ of the first device D6 releases the second member O2$g$ which in turn releases the first members O1$g$ and O1$h$. The third body C3 and the second subassembly E2 are then released and may be deployed to their respective final positions (shown by the dashed line in FIG. 11B and the continuous line in FIG. 11C) on either side of the second body C2. When the fourth body C4 of the second subassembly E2 reaches its final position, which is also its limit position, the third member O3$h$ of the second device D7 releases the second member O2$h$ which in turn releases the first member O1$h$. The fifth body C5 is then released and may be deployed to its final position (shown in dashed line in FIG. 11C).

It is important to note that within a deployable structure according to the invention a body may be considered as fixed relative to one sequencing device and mobile relative to another sequencing device because of the relative nature of the displacement of the bodies relative to each other.

The invention is not limited to the embodiments of a sequencing device and deployable structure described above by way of example only, and encompasses all variants thereof that the person skilled in the art might envisage that fall within the scope of the following claims.

Thus there are described above with reference to the figures deployable structures in which the kinematics of the bodies to be deployed are pure rotations. However, the invention is not limited to this type of kinematic. It relates to any type of kinematic comprising at least one pure rotation and/or at least one pure translation.

Moreover, there are described above with reference to the figures deployable structures in which the third body is generally interleaved between the first and second bodies. This is not obligatory, however. The third body may be disposed above (or against or near) the first and second bodies, provided that it is mounted to rotate on one of them.

The invention claimed is:

1. A sequencing device for a deployable structure, the sequencing device comprising:
   a first body,
   at least one second body mobile along a kinematic from an initial position to a final position relative to said first body, and
   at least one third body mobile relative to either said first body or said second body and disposed, in an at least partially folded position of said structure, between said first and second bodies, which device further comprises
   a first member fixedly mounted on said third body and adapted to prevent deployment of the third body when the first member is immobilized, and
   a second member mounted on said second body and adapted to immobilize said first member until said second body has effected a selected portion of said kinematic of the second body, wherein said selected portion of said kinematic comprises a portion less than said kinematic of the second body from said initial position to said final position.

2. The device claimed in claim 1 wherein said first member takes the form of a finger and said second member takes the form of a first arm having an end portion conformed to immobilize said finger.

3. The device claimed in claim 2 wherein said end portion comprises a shaft substantially perpendicular to said first arm and adapted to immobilize said finger.

4. The device claimed in claim 1 wherein said first body comprises a fixed third member that is adapted to constrain said second member to immobilize said first member until said second body has effected said selected portion of said kinematic.

5. The device claimed in claim 4 wherein said third member is a cam whose shape is selected to reproduce at least in part said selected portion of said kinematic.

6. The device claimed in claim 5 wherein said first member takes the form of a finger and said second member takes the form of a first arm having an end portion conformed to immobilize said finger; and
wherein said end portion comprises a shaft substantially perpendicular to said first arm and adapted to immobilize said finger and said shaft has first and second portions projecting on either side of said end portion of said first arm, said first portion being adapted to immobilize said finger and said second portion having one end adapted to slide along said cam in the course of said selected portion of said kinematic.

7. The device claimed in claim 6 wherein said shaft is adapted to be moved in translation substantially perpendicularly to said first arm by a return force when the end of its second portion is no longer in contact with said cam so as to move from a first position in which it immobilizes said finger to a second position in which it releases said finger.

8. The device claimed in claim 5, wherein said first member takes the form of a finger and said second member takes the form of a first arm having an end portion conformed to immobilize said finger, and wherein said end portion comprises a shaft substantially perpendicular to said first arm and adapted to immobilize said finger and said first arm is mounted to be rotated on said second body by a return force and said end portion of said first arm is adapted to be placed in a first position in which said end portion follows a profile of said cam that reproduces said selected portion of said kinematic, whilst immobilizing said finger when said second body moves toward said final position, and in a second position in which said end portion releases said finger when said end portion is no longer constrained to follow said cam profile.

9. The device claimed in claim 8 wherein said end portion of said arm comprises a rotatable cylinder adapted to bear against said cam profile.

10. The device claimed in claim 5 wherein said first member takes the form of a finger, said second member takes the form of a first arm having an end portion conformed to immobilize said finger, said finger is substantially in alignment with said third body, and said end portion of said first arm comprises a groove in which is mounted to rotate a bracket having a first portion adapted to bear against said cam in the course of said selected portion of said kinematic and a second portion adapted to immobilize said finger in the course of said selected portion of said kinematic.

11. The device claimed in claim 4 wherein said first member takes the form of a finger and said second member takes the form of a first arm having an end portion conformed to immobilize said finger; and
said end portion comprises a shaft substantially perpendicular to said first arm and adapted to immobilize said finger, said third member is a second arm having an end portion comprising a groove, and said shaft is mounted to rotate at the end of said first arm and comprises first and second portions projecting, in an immobilizing position, on either side of the end portion of said first arm, said first portion being adapted to immobilize said finger when said second portion is accommodated in said groove and said second portion being adapted to remain accommodated in said groove until said second body has effected said selected kinematic portion.

12. A deployable structure comprising:
a first body,
at least one second body mobile along a kinematic from an initial position to a final position relative to said first body, and
at least one third body mobile relative to either said first body or said second body and disposed, in a folded position of said structure, between said first body and said second body, which deployable structure further comprises at least one sequencing device; the at least one sequencing device comprising:
a first member fixedly mounted on the third body and configured to prevent deployment of the third body when the first member is immobilized, and
a second member mounted on the second body and configured to immobilize the first member until the second body has effected a selected portion of said kinematic of the second body,
wherein said selected portion of said kinematic comprises a portion less than said kinematic of the second body from said initial position to said final position.

13. The structure claimed in claim 12 wherein said selected portion of said kinematic of said second body comprises at least one pure rotation over a selected angular sector.

14. The structure claimed in claim 12 wherein said selected portion of said kinematic of said second body comprises at least one movement in pure translation over a selected distance.

15. The structure claimed in claim 12 wherein said selected portion of said kinematic of said second body is a combination of at least one pure rotation over a selected angular sector and/or at least one movement in pure translation over a selected distance.

16. The structure claimed in claim 12 wherein at least one of said bodies constitutes at least a portion of a telecommunication antenna.

17. The structure claimed in claim 12 wherein at least one of said bodies constitutes at least a portion of a solar generator.

18. The structure claimed in claim 12 wherein at least one of said bodies constitutes at least a portion of a heat transfer device.

19. A sequencing device for a deployable structure, the sequencing device comprising:
a first body;
a second body deployable relative to the first body from a stowed position to a fully deployed position;
a third body deployable relative to either the first body or the second body;
a first member fixedly mounted to the third body that prevents deployment of the third body when movement of said first member is restricted; and
a second member mounted to the second body and configured to restrict the movement of the first member until the second body has moved a predetermined portion of the way between the stowed position and the fully deployed position, such that the third body begins moving prior to the second body reaching the fully deployed position, wherein one of said first or second member defines a cam surface and the other of said first or second member rides on said cam surface while said second body moves said predetermined portion of the way between the stowed position and the fully deployed position.

20. The device according to claim 19, wherein the first body is a first panel, the second body is a second panel, and the third body is a third panel; and wherein the device is structured to initially stow all three panels so that the third panel is between the first panel and the second panel.

21. The device according to claim 19, wherein the first member is a finger and the second member is an arm having an end portion that immobilizes the finger until the second body has moved the predetermined portion of the way between the stowed position the fully deployed position.

22. The device according to claim 19, wherein, during the movement of the second body along said predetermined portion of the way between the stowed position and the fully deployed position, a contact point between the first member and the second member moves relative to an axis of rotation of the first body and second body, such that the contact point and axis of rotation are not coincident at all times during the movement of the second body along said predetermined portion.

23. The device according to claim 19, wherein the first member and the second member remain in continuous contact during the movement of the second body along said predetermined portion of the way between the stowed position and the fully deployed position.

24. A sequencing device for a deployable structure, the sequencing device comprising:

a first body;

a second body deployable relative to the first body from a stowed position to a fully deployed position;

a third body deployable relative to either the first body or the second body;

a first member fixedly mounted to the third body that prevents deployment of the third body when the first member is immobilized;

a second member mounted to the second body and configured to immobilize the first member until the second body has moved a predetermined portion of the way between the stowed position and the fully deployed position; and a third member fixedly mounted to said first body that is adapted to constrain said second member to immobilize said first member while said second body moves said predetermined portion of the way between the stowed position and the fully deployed position, such that the third body begins moving prior to the second body reaching the fully deployed position.

\* \* \* \* \*